Figure 1:
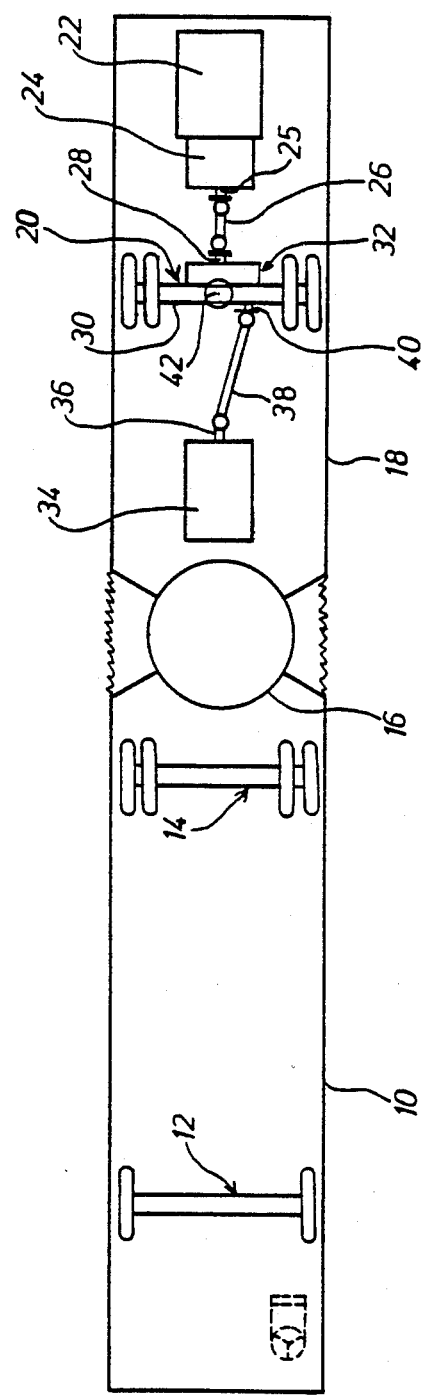

United States Patent [19]

Rauneker

[11] Patent Number: 4,511,012

[45] Date of Patent: Apr. 16, 1985

[54] DRIVE AXLE FOR A MOTOR VEHICLE

[75] Inventor: Josef Rauneker, Ostfildern-Ruit, Fed. Rep. of Germany

[73] Assignee: Daimler-Benz Aktiengesellschaft, Fed. Rep. of Germany

[21] Appl. No.: 479,816

[22] Filed: Mar. 28, 1983

[30] Foreign Application Priority Data

Mar. 30, 1982 [DE] Fed. Rep. of Germany ....... 3211621

[51] Int. Cl.³ .......................................... B62D 25/00
[52] U.S. Cl. .................................. 180/65.2; 180/247; 74/665 E
[58] Field of Search ..................... 180/65.2, 247, 69.6; 74/661, 665 E

[56] References Cited

U.S. PATENT DOCUMENTS 2,183,667 12/1939 Buckendale ........................ 180/65.2
2,443,720 6/1948 Burrus ................................. 74/661
4,405,079 9/1983 Hunt ................................... 180/65.2

FOREIGN PATENT DOCUMENTS 2538923 3/1975 Fed. Rep. of Germany ..... 180/65.2

Primary Examiner—David M. Mitchell
Assistant Examiner—Donn McGiehan
Attorney, Agent, or Firm—Craig & Burns

[57] ABSTRACT

The invention relates to a drive axle for a motor vehicle, which axle can be driven by an internal combustion engine or an electric motor, according to choice.

For the above-mentioned purpose, a changeover gear unit is installed on the axle beam of the drive axle, this gear unit being equipped with one gear unit input shaft for each drive unit, it being possible to connect these drive unit input shafts, individually, to the gear unit output shaft driving the differential gear, coupling being effected by means of a shifting clutch, the axes of the shafts extending at right angles to the axis of the axle beam.

The drive ends of the two gear unit input shafts are located on opposite sides of the changeover gear unit, so that the two drive units can be positioned on different sides of the axle and, as a result, the axle loading is configured in a correspondingly advantageous manner. In addition, it is possible to drive the axle by means of the electric motor, while at the same time by-passing the conventional gearbox which is located in the drive line from the internal combustion engine.

22 Claims, 2 Drawing Figures

DRIVE AXLE FOR A MOTOR VEHICLE

The invention relates to a drive axle system for a motor vehicle, wherein a drive axle can be driven by an internal combustion engine or an electric motor, according to choice, and to which axle a gear unit is assigned, this gear unit possessing gear unit input shafts which can be driven by one of the drive units in each case, a gear unit output shaft which is coupled to the drive axle, as well as a shifting clutch for coupling the gear unit output shaft to one of the gear unit input shafts, this shifting clutch interacting with tooth systems which function as driving devices, the gear unit shafts being installed axially parallel to one another and at right angles to the lengthwise direction of the axle beam of the drive axle.

In a known motor vehicle which can be driven both by an internal combustion engine and by an electric motor, a transmission unit is located in the drive line, on the drive unit side of the drive axle, in a manner corresponding to the design described above, it being possible to drive the output shaft of this transmission unit by either drive unit alternately, this transmission unit output shaft being connected to the drive axle in a manner capable of transmitting the drive (German Offenlegungsschrift No. 2,805,594, Offenlegungstag Aug. 18, 1979).

For this purpose, a conventional multi-speed gearbox and a multi-speed auxiliary gearbox are integrated into the transmission unit, the conventional gearbox being assigned to the internal combustion engine, and the auxiliary gearbox being assigned to the electric motor.

In practice, however, it has been found that when an electric motor is employed, it can be very difficult to design the system for controlling the gear trains of the two gearboxes, these gear trains also being capable of interconnection, on account of the stepwise nature of the ratio changes. Moreover, the opposed arrangement of the two drive units, necessitated by the restrictions affecting installation space, can present both technical and constructional problems with regard to the connection of the drive units to the gear unit.

If, therefore, the motor vehicles concerned possess three or more axles, the separate drive of each of two axles by one of the drive units in each case is preferred, it then being possible to provide a direct drive arrangement for the electric motor.

A feature underlying the invention is the provision of a drive axle, of the type initially described, for a motor vehicle, which axle can be driven directly by an electric motor, the intention being that the devices for selecting the drive unit which is to be used should be distinguished by particular simplicity, both in their mode of operation and construction.

This feature is achieved, according to the invention, in that the gear unit is a changeover gear unit which is installed on the axle beam of the drive axle, and which serves merely for the alternative selection of one of the drive units, in that the drive ends of the gear unit input shafts, which are mounted, spaced apart, one above the other, are led out of the changeover gear unit on opposite sides, and in that one of the gear unit input shafts is mounted beneath the gear unit output shaft and carries a spur pinion which is installed in a manner preventing rotation and which meshes with a spur pinion which is installed, in particular, on the gear unit output shaft, it being possible to couple the latter spur pinion to the gear unit output shaft by means of the shifting clutch, while simultaneously decoupling the other gear unit input shaft from the gear unit output shaft.

The axle design according to the invention enables the drive units to be located on opposite sides of the axle beam, as a result of which it is possible to set up the loading of the drive axle, by the drive units, in a correspondingly advantageous manner. At the same time, it is immaterial which gear unit input shaft is driven by which drive unit.

The arrangement of one of the gear unit input shafts, beneath its output shaft, in conjunction with the arrangement of the pinions and the shifting clutch, as explained, ensures that the lower gear unit input shaft, running in the oil bath, and its spur pinion remain stationary when the other gear unit input shaft is being driven by one of the two drive units. Unnecessary foaming and heating of the oil does not therefore occur. The possibility of oil being lost through being thrown out into a space in the axle beam adjacent to the gear unit space is equally unlikely.

Finally, the construction of the changeover gear unit permits a design employing only one clutch, it also being possible, within the scope of the invention, for one or both of the gear unit input shafts to extend obliquely with respect to the lengthwise direction of the axle beam.

At the same time, a particularly space-saving mutual arrangement of the gear unit components can be achieved if the upper gear unit input shaft, which can be driven by the internal combustion engine, is arranged coaxially with the gear unit output shaft, and if each of the two shafts carries a tooth system which functions as a driving device, and which can be coupled to the other tooth system by means of a shifting clutch. In this case, it is possible to highlight, to a particular degree, the advantage which can be obtained through stopping the lower gear unit input shaft.

Motor vehicles which can be driven by an internal combustion engine or an electric motor should customarily be capable of being driven at a higher speed by means of the internal combustion engine than when the electric motor is being employed. It is accordingly necessary to arrange that the auxiliary reduction gear, formed by the spur pinions, has a ratio such that the spur pinion which is located, in a manner preventing rotation, on the lower gear unit input shaft, which can be driven by the electric motor, rotates at a speed, when the vehicle is being driven by the electric motor, which is appropriately higher than the speed at which the other spur pinion rotates.

If the lower gear unit input shaft were now to rotate with the other input shaft while the internal combustion engine is being employed, the spur pinion seated on this lower input shaft would consequently rotate at a speed which would be correspondingly higher than the speed at which the other spur pinion rotates, and this would have a correspondingly disadvantageous effect on the oil bath.

In a further advantageous embodiment of the invention, the gear unit input shaft which can be driven by the electric motor is formed by two part-shafts which can be plug-fitted together in a manner preventing them from twisting relative to one another, one of these part-shafts being mounted in the axle beam, or in an axle casing, and the other in the changeover gear unit. As a result, it is possible, for example in order to carry out repair operations on the changeover gear unit, to remove this unit from the axle beam, without also having to dismantle the drive-side mounting of the lower gear unit input shaft in the axle beam.

Finally, it is advantageous to integrate a cylinder/piston unit, which can, in particular, be operated by means of compressed air, into the changeover gear unit, for the purpose of actuating the changeover clutch, thereby enabling the gearshifting operations, for changing the type of drive, to be carried out by remote control from the driver's seat.

It is therefore an object of the invention to provide an improved drive axle system for a motor vehicle.

It is another object of the invention to provide an improved drive axle system for a motor vehicle wherein a drive axle can be driven by a drive unit comprising one of an internal combustion engine and an electric motor, and to which axle a gear unit is assigned, this gear unit possessing gear unit input shafts which can be driven by one of the drive units in each case, a gear unit output shaft which is coupled to the drive axle, as well as a shifting clutch for coupling the gear unit output shaft to one of the gear unit input shafts, the shifting clutch interacting with toothed systems which function as driving devices, the gear unit shafts being installed axially parallel to one another at right angles to the lengthwise direction of the axle beam of the drive axle, the gear unit being a changeover gear unit which is installed upon the axle beam of the drive axle, and which serves for an alternative selection of one of the drive units, internal combustion engine and electric motor, the drive ends of the gear unit input shafts which are mounted, spaced apart, one above the other, are led out of the changeover gear unit on opposite sides, and in that one of the gear unit input shafts is mounted beneath the gear unit output shaft and carries a spur pinion which is installed in a manner preventing rotation and which meshes with a spur pinion which is installed upon the gear unit output shaft, it being possible to couple the latter spur pinion to the gear unit output shaft by means of the shifting clutch, while simultaneously decoupling the other gear unit input shaft from the gear unit output shaft.

It is another object of the invention to provide a system for reduction of space requirements for a drive axle system for a vehicle having a drive axle mounted in an axle beam and disposed between and to be connected to first and second power sources, comprising an output shaft means for driving an axle of the vehicle, first input drive shaft means coaxial with the output shaft drive means and driven by said first power source, first toothed system mounted to said first input shaft means, second input shaft means disposed parallel to said first input shaft means and driven by said second power source, second toothed system driven by said second input shaft means, third toothed system mounted to said output shaft means and shifting clutch means comprising a shifting sleeve means for selectively coupling the third toothed system to one of said first and second toothed systems.

It is another object of the invention to provide a system for reduction of space requirements for a drive axle system for a vehicle having a drive axle to be connected to first and second power sources wherein a first power source is connected to the drive axle by way of a first input drive shaft means coaxial with an output shaft means for driving the drive axle and the second power source is connected to said output shaft means by a second input shaft means disposed parallel to said first input drive shaft means and disposed in parallel thereto and below the drive axle.

It is another object of the invention to so dispose the respective first and second drive shaft means so that an oil bath provided for one input drive shaft means is unaffected by the actuation of a second input drive shaft means, thereby minimizing heating and foaming of the oil bath.

Figure 2:
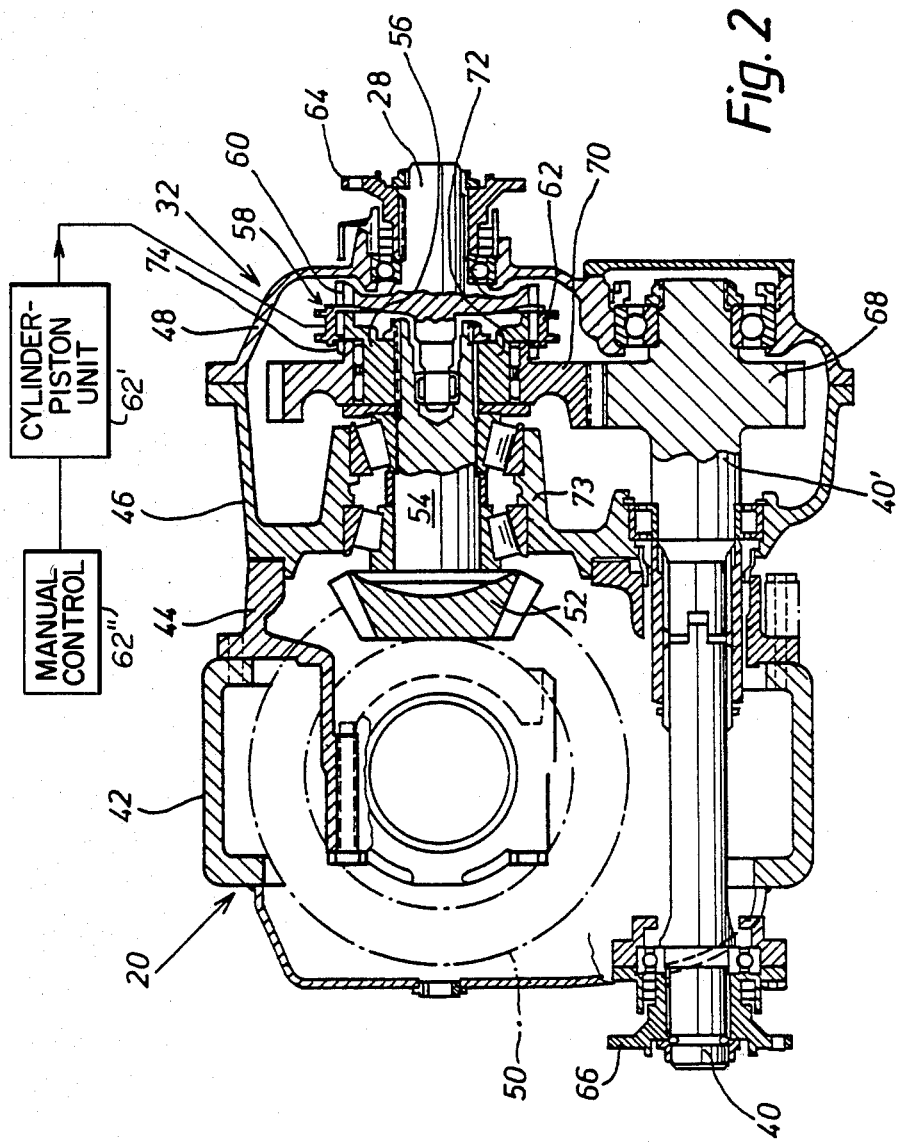

These and other objects, features, and advantages of the present invention will become more apparent from the following description when taken in connection with the accompanying drawings which show, for the purposes of illustration only, one embodiment in accordance with the present invention, and wherein:

FIG. 1 shows, in a diagrammatic representation, a view from below of an articulated bus, this example having three axles, its trailer axle, designed in accordance with the invention, forming the drive axle of this vehicle, FIG. 2 shows a cross-section through the drive axle, in the region of the axle bracket.

With reference to the drawings wherein like parts are indicated by like reference numerals, FIG. 1 shows an articulated bus which comprises a front vehicle-section 10, incorporating a steered front axle 12 and a central axle 14, and a trailer 18 which is coupled-on via a joint 16, the trailer axle forming a drive axle 20 which is designed in accordance with the invention. This drive axle can be driven by an internal combustion engine 22 or an electric motor 34, according to choice. In the case of a motor vehicle possessing two axles, the drive axle could, of course, also form the rear axle.

With reference to the forward direction of travel of the vehicle, the internal combustion engine 22, which is preferably in the form of a diesel engine, is installed behind the drive axle 20, that is to say in the rear end of the trailer 18, a conventional gearbox 24, preferably of the automatic type, being located in the drive line from this engine, the output shaft 25 of this gearbox being connected, in order to transmit the drive, via a cardan shaft 26, to a gear unit input shaft 28 of a changeover gear unit 32 which serves to effect the alternative selection of one of the drive units, this changeover gear unit being installed on the axle beam 30 of the drive axle 20.

The electric motor 34, which is provided for the alternative drive of the vehicle, is located on that side of the drive axle 20 opposite to that on which the internal combustion engine 22 is located, that is to say between the drive axle and the joint 16. A cardan shaft 38 is likewise used in order to connect the shaft 36 of this motor to the drive axle 20, this cardan shaft being flanged onto to a second gear unit input shaft 40 of the changeover gear unit 32.

By equipping the drive axle 20 with the changeover gear unit 32, it is possible to drive the drive axle 20 directly, bypassing the conventional gearbox 24 which is located in the drive line from the internal combustion engine 22, so that the conventional gearbox 24 merely has to be designed as a characteristics-converter for altering the output characteristics of the internal combustion engine 22.

If, for example, in the case of the arrangement, which has been described, of the two drive units with respect to the drive axle 20, the drive from the electric motor 34 were also transmitted to the drive axle 20 via the gear unit output shaft 25 of the automatic gearbox 24, an additional transfer gearbox would also be necessary in order to transfer the drive, over and above additional transmission ratios, wholly disregarding the fact that a cardan shaft crossing the axle beam, would be necessary in order to transmit the drive, the installation of which shaft would create problems, particularly with regard to the movements of the body of the motor vehicle as its suspension system compresses and extends.

Equipping the drive axle 20 with the changeover gear unit 32 consequently makes it possible to achieve considerable technical simplification and, above all, a favorable distribution of the masses of the drive units in relation to the drive axle.

As shown in FIG. 2, the changeover gear unit 32 is installed on a support body 44 of the differential gear unit, this support body 44 being flanged onto an axle casing 42 which receives the differential gear unit of the drive axle 20, one, 46, of the halves of the gear unit casing 46 and 48 at the same time forming the mounting body for a bevel drive pinion 52 which meshes with a ring gear 50 of the differential gear unit, the bearing-shaft 54 of the bevel drive pinion 52, in an advantageous embodiment of the invention, at the same time forming the gear unit output shaft of the changeover gear unit 32.

The gear unit input shaft 28 which can be driven by the diesel engine 22 is preferably mounted coaxially with the gear unit output shaft, or with the bearing shaft 54 on which is mounted a mounting body 72 supporting a first toothed driving ring 56 of a shifting clutch 58 in a manner preventing rotation of driving ring 56 with respect to bearing shaft 54, to which ring an identical toothed driving ring 60 on the gear unit input shaft 28 is assigned. A shifting-sleeve 62, is assigned to these toothed driving rings, it being possible to slide the sleeve 62, in the axial direction, in relation to the toothed driving rings 56 and 60, the teeth of which are preferably of the involute type, the sleeve 62 being moved, as appropriate, in order to decouple the gear unit input shaft 28 from the gear unit output shaft 54 or vice versa. In order to drive the gear unit input shaft 28 by means of the diesel engine, the shaft 28 is equipped with a coupling flange 64, fitted on it in a manner preventing rotation of coupling flange 64 with respect to input shaft 28, which can be bolted to a corresponding counterflange on the cardan shaft 26 shown in FIG. 1.

As already mentioned, a further gear unit input shaft 40 is used in order to drive the drive axle 20 by means of the electric motor 34, the drive end of the shaft 40, which end is led out of the axle beam 30, FIG. 1, likewise carrying a coupling flange 66 for coupling-on the cardan shaft 38 which can be driven by the electric motor 34. As can be seen from FIG. 1, this gear unit input shaft is located in a position which is somewhat offset, in the lateral direction, with respect to the axle casing 42, and preferably extends with its axis parallel to the two gear unit shafts 28, 54. It is composed of two part-shafts, only one 40' of which is mounted in the casing 46, 48 of the changeover gear unit 32, while the other part-shaft 40 is mounted, in suitable manner, in the axle beam 30, and is connected to the part-shaft 40' by means of a plug-type connection, in a manner which prevents rotation of part-shaft 40' with respect to part-shaft 40, but which can be released. A spur pinion 68 is integrally formed, on the periphery of the part-shaft 40', the spur pinion 68 meshing with a spur pinion 70 which is mounted, in a manner permitting rotation, on a mounting body 72, the mounting body 72 carrying the toothed driving ring 56, the mounting body 72 seating, in a manner preventing rotation of mounting body 72 with respect to bearing shaft 54, on the rear end of the bearing shaft 54 which forms the gear unit output shaft.

The spur pinion 70 could also be mounted, for example, equally effectively on a mounting which is rigidly attached to the casing, for example on the conical collar 73 on which the output shaft 54 is mounted. On its end face adjacent to the shifting-sleeve 62, the spur pinion 70 is provided with a collar which forms a further toothed driving ring 74, likewise forming a component of the shifting clutch 58, and serves to connect the spur pinion 70 to the gear unit output shaft 54, in a manner preventing rotation of output shaft 54 with respect to the further toothed driving ring 74, while the gear unit input shaft 28 is simultaneously decoupled from the gear unit output shaft, in order to enable it to be driven directly by the gear unit input shaft 40, and by the electric motor 34.

In order to actuate the shifting-sleeve 62, a cylinder/-piston unit 62 which can, in particular, be operated by means of compressed air and which can be triggered from the driver's seat via manual control 62'', is installed, preferably in the changeover gear unit.

If the gear unit input shaft 28, which can be driven by the diesel engine 22, is coupled to the gear unit output shaft 54, only these two shafts, 22 and 54, rotate, while the reduction gear unit, formed by the two spur pinions 68 and 70 and the gear unit input shaft 40, remains stationary. There is consequently a direct drive-connection between the gear unit input shaft 28 and the bevel drive pinion 52, the force flow leading from this bevel pinion 52 to the outer planetary gear trains of the drive axle 20, via the ring gear 50 and the pinion shafts of the drive axle 20. The oil bath in which the reduction gear shaft, formed by the gear unit input shaft 40, 40' and the spur pinion 68, runs is consequently unaffected when the drive is being provided by the diesel engine 22, that is to say it is not heated and not caused to foam during diesel operation.

Since, when the diesel engine is providing the drive, the two gearwheels 68, 70 do not rotate, it is clear that the efficiency of the changeover gear unit is correspondingly advantageous.

The gear-unit arrangement which has been described requires merely one shifting clutch 58 in order to effect the separate drive-connection of the two gear unit input shafts 28 and 40-40' to the gear unit output shaft 54, as a result of which it is also possible to minimize the technical expense to such an extent that the changeover gear unit can be manufactured particularly inexpensively. This gear unit concept is not obvious to a person skilled in the art, since the coupling and decoupling, according to choice, of two shafts to and, as appropriate, from a third gear unit shaft is normally achieved by designs in which a clutch is dedicated to each spur pinion of the reduction gearing, and the shifting-sleeves of these clutches can be moved into their coupling or decoupling positions, in an alternating manner, by means of a rocker.

In addition to the construction described hereinabove it should be noted that an important feature of the invention is that the one gear unit input shaft 40, 40' crosses the center axis of the axle beam 30 and is arranged at a distance beneath the center axis.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. A drive axle system for a motor vehicle, wherein a drive axle can be driven by a drive unit comprising one of an internal combustion engine and an electric motor, and to which axle a gear unit is assigned, this gear unit possessing gear unit input shafts which can be driven by one of the drive units in each case, a gear unit output shaft which is coupled to the drive axle, as well as a shifting clutch for coupling the gear unit output shaft to one of the gear unit input shafts, the shifting clutch interacting with tooth systems which function as driving devices, the gear unit shafts being installed axially parallel to one another and at right angles to the lengthwise direction of the axle beam of the drive axle, characterized in that the gear unit is a changeover gear unit which is installed on the axle beam of the drive axle, and which serves for alternative selection of one of the drive units, internal combustion engine and electric motor, in that the drive ends of the gear unit input shafts, which are mounted, spaced apart, one above the other, are led out of the changeover gear unit on opposite sides, and in that one of the gear unit input shafts is mounted beneath the gear unit output shaft and carries a spur pinion which is installed in a manner preventing rotation with respect to said one input shaft and which meshes with a spur pinion which is installed on the gear unit output shaft, it being possible to couple the latter spur pinion to the gear unit output shaft by means of the shifting clutch, while simultaneously decoupling the other gear unit input shaft from the gear unit output shaft.

2. A drive axle system, according to claim 1, characterized in that the gear unit output shaft carries a bevel drive pinion which meshes with a ring gear of a differential gear unit of the drive axle.

3. A motor vehicle driving axle according to claim 2, characterized in that the second gear shaft that can be coupled with the drive shaft of the differential gear is arranged coaxially with the drive shaft and that the second gear shaft and drive shaft and the transmitting toothed wheel, carry respectively one drive-type toothing means each, for coupling by the clutch of the second gear shaft to the drive shaft and of the transmitting toothed wheel to the drive shaft.

4. A motor vehicle driving axle according to claim 2, characterized in that the first gear shaft crossing the shaft of the axle body is formed by two partial shafts engageable so that they cannot be turned with respect to one another, of which one is disposed in one of the axle body and an axle bracket and the other is disposed in the intermediate gear.

5. A motor vehicle driving axle according to claim 1, characterized in that the first gear shaft crossing the shaft of the axle body can be driven by the electric motor which, in forward driving direction, is arranged in front of the axle body.

6. A drive axle system, according to claim 1, for a motor vehicle, characterized in that the gear unit input shaft driven by the internal combustion engine is arranged coaxially with the gear unit output shaft, and in that each of the two shafts carries a tooth system which functions as a driving device, it being possible to couple these tooth systems together by means of the shifting clutch.

7. A drive axle system, according to claim 2, for a motor vehicle, wherein the drive axle has an axle casing and characterized in that the gear unit input shaft which can be driven by means of the electric motor is formed by two part-shafts which can be plug-fitted together in a manner preventing them from twisting relative to one another, one of these part-shafts being mounted in one of the axle beams and the axle casing, and the other part-shaft being mounted in the changeover gear unit.

8. A drive axle system, according to claim 1, for a motor vehicle, characterized in that the shifting clutch can be actuated by means of a cylinder/piston unit which is integrated into the changeover gear unit and can be operated by means of compressed air.

9. A drive axle system, according to claim 2, for a motor vehicle, characterized in that the gear unit input shaft driven by the internal combustion engine is arranged coaxially with the gear unit output shaft, and in that each of the two shafts carries a tooth system which functions as a driving device, it being possible to couple these tooth systems together by means of the shifting clutch.

10. A drive axle system, according to claim 6, for a motor vehicle, wherein the drive axle has an axle casing and characterized in that the gear unit input shaft which can be driven by means of the electric motor is formed by two part-shafts which can be plug-fitted together in a manner preventing them from twisting relative to one another, one of these part-shafts being mounted in one of the axle beams and the axle casing, and the other part-shaft being mounted in the changeover gear unit.

11. A drive axle system, according to claim 2, for a motor vehicle, characterized in that the shifting clutch can be actuated by means of a cylinder/piston unit which is integrated into the changeover gear unit and can be operated by means of compressed air.

12. A drive axle system, according to claim 6, for a motor vehicle, characterized in that the shifting clutch can be actuated by means of a cylinder/piston unit which is integrated into the changeover gear unit and can be operated by means of compressed air.

13. A drive axle system, according to claim 7, for a motor vehicle, characterized in that the shifting clutch can be actuated by means of a cylinder/piston unit which is integrated into the changeover gear unit and can be operated by means of compressed air.

14. A system for reduction of space requirements for a drive axle system for a vehicle having a drive axle mounting in an axle beam and disposed between and connected to first and second power sources comprising an output shaft means for driving an axle of the vehicle, first input drive shaft means coaxial with the output shaft means and driven by said first power source, first toothed system mounted to said first input shaft means, second input shaft means disposed parallel to said first input shaft means and driven by said second power source, second toothed system driven by said second input shaft means, third toothed system mounted to said output shaft means, and shifting clutch means comprising a shifting-sleeve means for selectively coupling the third toothed system to one of said first and second toothed systems.

15. A system for reduction of space requirements as set forth in claim 14, wherein said output shaft means comprises a bevel drive pinion means, and said system further comprises ring gear means driven by said bevel drive pinion means for driving the axle.

16. A system for reduction of space requirements as set forth in claim 14, wherein said power sources are an internal combustion engine and an electric motor, and the first input drive means is driven by the internal combustion engine.

17. A system for reduction of space requirements as set forth in claim 16 wherein, the second drive means comprises a first part-shaft means disposed below the drive axle and driven by the electric motor, and second part-shaft means driven by said first part-shaft means for driving said second toothed system.

18. A system for reduction of space requirements as set forth in claim 14 further comprising means for manually actuating the shifting clutch means.

19. A system for reduction of space requirements as set forth in claim 14 wherein said second drive means further comprises a gear reduction means having an oil bath therefor disposed remote from the first input drive shaft means, first toothed system and third toothed system to preclude heating and foaming of the oil bath during driving of the output shaft means by the first input drive shaft means.

20. A motor vehicle driving axle, drivable by means of an internal combustion engine arranged on one side of its axle body or by means of an electric motor arranged on its other side, having a differential gear and an intermediate gear provided between said differential gear and one drive assembly, said intermediate gear having first and second gear shafts respectively drivable by a single respective drive assembly, and arranged parallel at a distance from one another and vertically with respect to the shaft of the axle body, the first of said gear shafts crossing the axle body, and having a clutch for the optional drive by one of the drive assemblies, characterized in that the first gear shaft crossing the shaft of the axle body of the first and second gear shafts which are disposed in planes that are located above one another, is arranged below the shaft of the axle body, that a driving toothed wheel is arranged on said first gear shaft for rotation and having a transmitting toothed wheel mate, and that by means of the clutch arranged in the intermediate gear, one of the transmitting toothed wheel and the second gear shaft can be coupled with a drive shaft of the differential gear.

21. A motor vehicle driving axle according to claim 20, characterized in that the transmitting toothed wheel is disposed coaxially to the drive shaft of the differential gear.

22. A motor vehicle driving axle according to claim 20, characterized in that the intermediate gear and the differential gear form one structural unit.

* * * * *